US010605242B2

(12) United States Patent
Krapf et al.

(10) Patent No.: US 10,605,242 B2
(45) Date of Patent: Mar. 31, 2020

(54) ELECTRIC LUBRICANT PUMP COMPRISING A CONNECTABLE DRIVE

(71) Applicant: ZF Friedrichshafen AG, Friedrichshafen (DE)

(72) Inventors: Markus Krapf, Tettnang (DE); Ulrich Bohner, Immenstaad am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 361 days.

(21) Appl. No.: 15/037,707

(22) PCT Filed: Nov. 4, 2014

(86) PCT No.: PCT/EP2014/073618
§ 371 (c)(1),
(2) Date: May 19, 2016

(87) PCT Pub. No.: WO2015/082150
PCT Pub. Date: Jun. 11, 2015

(65) Prior Publication Data
US 2016/0298509 A1  Oct. 13, 2016

(30) Foreign Application Priority Data

Dec. 4, 2013  (DE) ......... 10 2013 224 849

(51) Int. Cl.
*F04C 15/00* (2006.01)
*F16H 57/04* (2010.01)
(Continued)

(52) U.S. Cl.
CPC ........... *F04C 15/0061* (2013.01); *F01M 1/02* (2013.01); *F01M 1/18* (2013.01); *F03D 15/00* (2016.05);
(Continued)

(58) Field of Classification Search
CPC .... F01M 1/18; F01M 1/02; F01M 2001/0215; F01M 2001/0253; F16D 27/108;
(Continued)

(56) References Cited

U.S. PATENT DOCUMENTS 2,130,780 A * 9/1938 Utrecht .................. F03D 15/10
29/76.1
4,037,687 A 7/1977 Krutz et al.
(Continued)

FOREIGN PATENT DOCUMENTS

DE 721 794 6/1942
DE 30 02 391 A1 8/1981
(Continued)

OTHER PUBLICATIONS

German Search Report Corresponding to 10 2013 224 849.0 dated Aug. 13, 2014.
(Continued)

*Primary Examiner* — Essama Omgba
*Assistant Examiner* — Stephen A Mick
(74) *Attorney, Agent, or Firm* — Davis & Bujold PLLC; Michael J. Bujold

(57) ABSTRACT

A device for the supply of lubricant with a lubricant pump (101), which has a driveshaft (103), and a motor (107). The motor (107) is designed to drive the driveshaft (103). At least one clutch (109, 111, 113) serves to establish and/or interrupt a force flow between a shaft in the force flow of a transmission and the driveshaft (103).

10 Claims, 1 Drawing Sheet

(51) Int. Cl.
*F03D 80/70* (2016.01)
*F03D 15/00* (2016.01)
*F01M 1/02* (2006.01)
*F01M 1/18* (2006.01)
*F16D 27/108* (2006.01)

(52) U.S. Cl.
CPC .......... *F03D 80/70* (2016.05); *F04C 15/008* (2013.01); *F04C 15/0073* (2013.01); *F16D 27/108* (2013.01); *F16H 57/0439* (2013.01); *F01M 2001/0215* (2013.01); *F01M 2001/0253* (2013.01); *F05B 2260/4023* (2013.01); *F05B 2260/98* (2013.01); *F16N 2260/20* (2013.01); *F16N 2260/50* (2013.01); *Y02E 10/72* (2013.01)

(58) Field of Classification Search
CPC ......... F03D 15/00; F03D 80/70; Y02E 10/72; F16N 2260/50; F16N 2260/20; F05B 2260/98; F04C 15/0061; F04C 15/0073; F04C 15/008; F16H 57/0439
USPC ............. 417/223, 374; 415/123; 184/4, 6.12
See application file for complete search history.

(56) References Cited

U.S. PATENT DOCUMENTS

| | | | |
|---|---|---|---|
| 4,458,644 A | 7/1984 | Papst | |
| 5,474,428 A | 12/1995 | Kimura et al. | |
| 6,863,140 B2 | 3/2005 | Noreikat et al. | |
| 8,939,258 B2 | 1/2015 | Becker | |
| 2008/0087487 A1* | 4/2008 | Agner | B60K 6/36 180/307 |
| 2008/0108469 A1 | 5/2008 | Weinschenker et al. | |
| 2011/0012365 A1* | 1/2011 | Becker | F03D 80/70 290/55 |
| 2012/0118102 A1* | 5/2012 | Schultz | F16H 61/0028 74/665 B |

FOREIGN PATENT DOCUMENTS

| | | |
|---|---|---|
| DE | 43 42 233 A1 | 6/1994 |
| DE | 101 60 466 C1 | 6/2003 |
| DE | 10 2006 030 041 A1 | 1/2008 |
| DE | 10 2008 008 005 A1 | 8/2009 |
| DE | 10 2008 013 728 A1 | 9/2009 |
| DE | 10 2010 002 014 A1 | 8/2011 |
| JP | S64-47919 U | 3/1989 |

OTHER PUBLICATIONS

International Search Report Corresponding to PCT/EP2014/073618 dated Jan. 21, 2015.
Written Opinion Corresponding to PCT/EP2014/073618 dated Jan. 21, 2015.

* cited by examiner

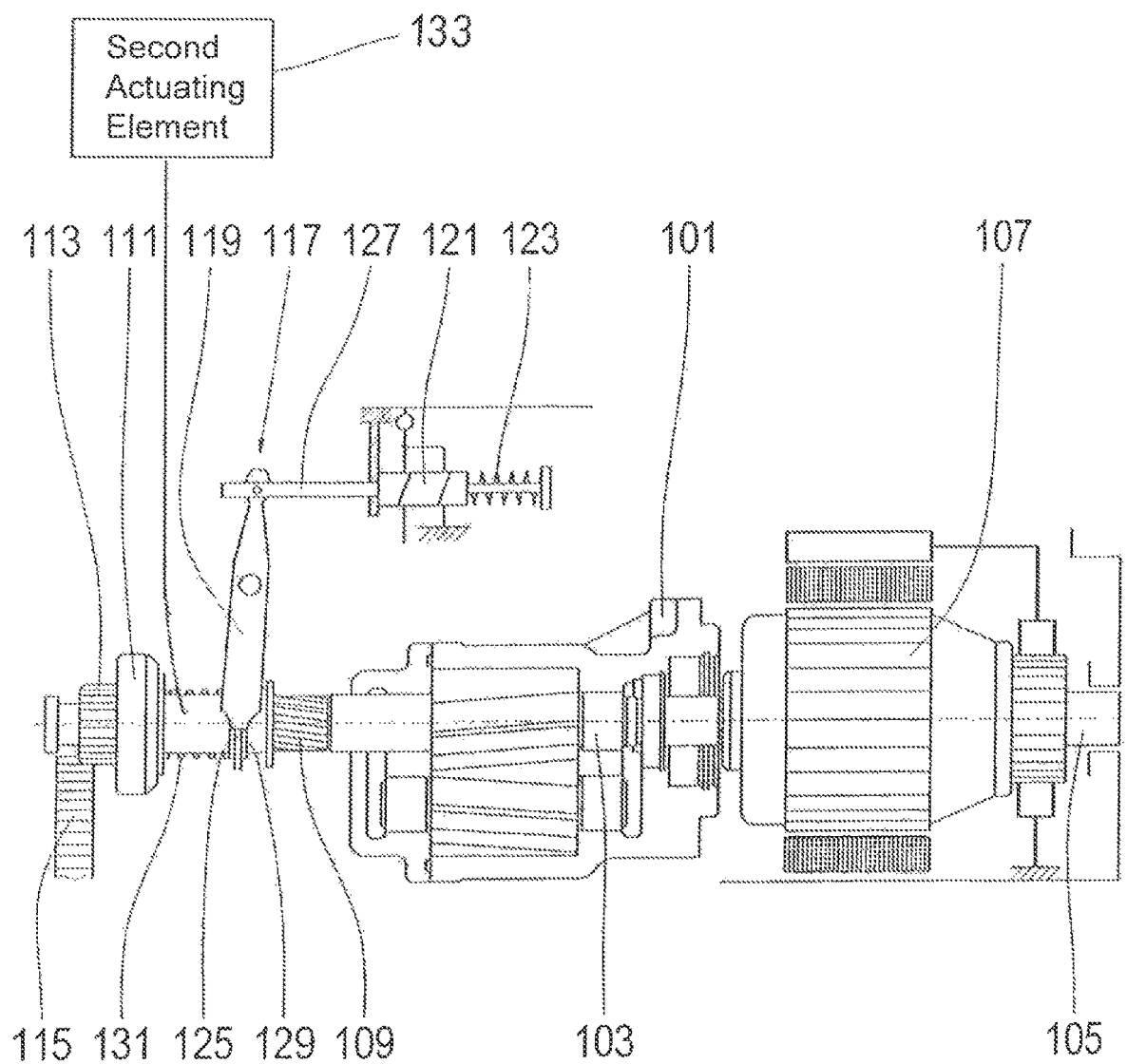

ELECTRIC LUBRICANT PUMP COMPRISING A CONNECTABLE DRIVE

This application is a National Stage completion of PCT/EP2014/073618 filed Nov. 4, 2014, which claims priority from German patent application serial no. 10 2013 224 849.0 filed Dec. 4, 2013.

FIELD OF THE INVENTION

The invention concerns a device for the supply of lubricant, in particular to at least one component of a transmission. Such a device is particularly suitable as an emergency lubrication device for a transmission of a wind turbine.

BACKGROUND OF THE INVENTION

Transmissions of wind turbines usually have a lubricant pump in order to supply lubrication points with lubricant by lubricant circulation. Such transmissions are exposed to high loads. A breakdown of the lubrication supply can therefore give rise to severe damage in a short time, which ultimately results in failure of the wind turbine.

To avoid this, emergency lubrication systems are used in wind turbines. Such devices serve to ensure the supply of lubricant to the transmission during emergency operation, i.e. in the event that a lubricant pump provided for normal operation has failed.

From the document DE 10 2008 013 728 A1 an emergency lubrication device with two pumps is known. A first, electrically driven pump supplies the transmission with lubricant during normal operation. For emergency operation a second pump is switched on. Its function has to be ensured even if the electric power is cut off. Accordingly, the second pump is not driven electrically. Instead, a clutch is provided which for emergency operation establishes a force flow between the transmission and the second pump.

To actuate the clutch a control element is provided. During normal operation, i.e. when a voltage is applied, the control element is activated. The activated control element opens the clutch. A spring is attached in such manner that when the clutch is open, the spring is stressed.

When during emergency operation there is no longer any voltage and the first pump is therefore inactive, the control element to is no longer active. Consequently, the spring relaxes and the clutch closes. This brings the second pump into the force flow of the transmission. The lubricant supply is ensured until the wind turbine has stopped.

The use of a second pump to create an emergency lubrication system has a number of disadvantages. The second pump increases the manufacturing costs of the transmission. Moreover, additional lines and connections are required in order to integrate the second pump into the lubricant circuit of the transmission. All the additional components incorporated also increase the weight of the transmission and take up additional space.

A further disadvantage relates to actuation of the control element. The lubricant supply can only be maintained when the energy supply fails, but not if the first pump becomes defective. Since the control element is only deactivated when voltage is no longer applied, i.e. when the energy supply to the wind turbine has failed, a defect of the first pump—which can also happen when the energy supply has not failed and a voltage is still being applied—results in a breakdown of the lubricant supply.

SUMMARY OF THE INVENTION

The purpose of the present invention is to ensure the supply of lubricant to a transmission during emergency operation while avoiding the disadvantages inherent in the systems known from the prior art.

A device according to the invention for supplying lubricant, in particular for supplying lubricant to at least one component of a transmission, especially a transmission of a wind turbine, comprises a lubricant pump and a motor. The lubricant pump is driven by a driveshaft. The motor is designed to power the driveshaft during normal operation. For that purpose a motor shaft is preferably connected to the driveshaft in a rotationally fixed manner.

Moreover, according to the invention the device comprises a first clutch. This is, located in a force flow between a shaft in the force flow of the transmission, and the driveshaft. The first clutch is designed to close and/or interrupt the force flow.

In this context, the term clutch is used to denote a means designed to establish and/or interrupt a force flow between two shafts. Thus, the first clutch is a means designed to establish and/or interrupt a force flow between the shaft in the force flow of the transmission, and the driveshaft.

The shaft in the force flow of the transmission is a shaft that is driven or turned by the transmission. Thus, rotation of the transmission, in particular the drive input shaft and/or the drive output shaft of the transmission, results in rotation of the shaft in the force flow of the transmission. In particular, the shaft in the force flow of the transmission can be identical to the transmission's drive input shaft or its drive output shaft. However, the shaft in the force flow of the transmission can also be an intermediate shaft of the transmission.

Accordingly, there are two alternative possibilities for driving the lubricant pump. During normal operation the first clutch interrupts the force flow between the shaft in the force flow of the transmission and the driveshaft of the lubricant pump. The lubricant pump is then driven by the motor. If the motor fails, i.e. in emergency operation, the first clutch establishes the force flow between the shaft in the force flow of the transmission and the driveshaft of the lubricant pump. The result is that the lubricant pump is driven by the transmission. Thus, the first clutch establishes a force flow between the transmission, or the shaft thereof in the force flow of the transmission, and the lubricant pump or its driveshaft. By closing the first clutch a rotationally fixed connection is formed between the shaft in the force flow of the transmission and the driveshaft of the lubricant pump.

So that besides the lubricant pump the motor too is not driven and consequently operating as a generator, the transmission can be equipped with a second clutch designed to establish and/or interrupt a force flow between the driveshaft of the lubricant pump and the motor. During normal operation, i.e. when an electric voltage is applied and the motor is driving the lubricant pump, the clutch is closed. The second clutch then forms a rotationally fixed connection between a driven shaft of the motor and the driveshaft of the lubricant pump, and thus a force flow between the motor and the lubricant pump. In emergency operation the second clutch interrupts that force flow and prevents the motor from rotating further. Alternatively, it is possible during emergency operation to cut off the motor from the power network by means of a switch provided for the purpose.

The motor can in particular be an electric motor. This only operates so long as, during normal operation, an electric voltage is applied to it. To ensure the lubricant supply when there is an energy breakdown, i.e. when there is no longer an electric voltage, in a preferred further development the device comprises a spring. The spring is arranged in such manner that it is stressed when the first clutch is open.

In this case a spring is an element with a spring function, i.e. a store of potential energy. Thus, the spring stores potential energy when it is stressed. When the spring is relaxed the potential energy is released again. Preferably, the spring is a spiral spring.

When the electric voltage is applied, according to this further development the first clutch is open. In particular, the clutch remains open throughout the time when the electric voltage is applied.

Preferably a first actuating element for opening the first clutch is provided, which is coupled with the energy supply of the wind turbine. Thus, when the electric voltage is applied, the voltage is applied in particular to the first actuating element.

When the voltage is applied to the first actuating element, the first actuating element is active and opens the first clutch. The first actuating element remains active and keeps the first clutch open for as long as the electric voltage is applied to the first actuating element. When the first clutch is open, and the force flow between the shaft in the force flow of the transmission and the driveshaft of the lubricant pump is therefore interrupted, the lubricant pump is driven by the motor.

When no electric voltage is being applied to the first actuating element—in particular when the energy supply of the wind turbine has broken down—the first actuating element becomes inactive and loses its function. The spring force of the spring stressed while the first clutch is open now acts in such manner that the clutch closes as the spring relaxes, so the force flow between the shaft in the force flow of the transmission and the driveshaft of the lubricant pump is established. Thus, the spring closes the first clutch when no electric voltage is applied to the first actuating element, and keeps the first clutch closed for as long as no electric voltage is applied to the first actuating element. The lubricant pump is then driven by the transmission.

The above-described measures serve to maintain the lubricant supply in the event of electric power breakdowns. However, without further precautions the actuating element would remain active if, with the energy supply intact, the motor were to become defective and break down. To be able to operate the lubricant pump in this event as well, a further preferred further development comprises a switch element for switching on and off the electric voltage applied in particular to the first actuating element.

When the energy supply is intact, switching on applies an electric voltage in particular to the first actuating element. Correspondingly, after switching off an electric voltage is no longer applied in particular to the first actuating element.

During normal operation the switch element switches on the electric voltage, which is applied in particular at the first actuating element. This activates the first actuating element, which opens the first clutch and stresses the spring. Thereby the force flow between the shaft in the force flow of the transmission and the driveshaft of the lubricant pump is interrupted, so that the motor can drive the lubricant pump.

On the other hand, if the lubricant pump is defective, the switch element switches off the voltage applied in particular to the first actuating element. This deactivates the first actuating element so that the spring, which was stressed when the clutch opened, relaxes and the clutch closes. Consequently the force flow between the shaft in the force flow of the transmission and the driveshaft of the lubricant pump is established.

In a further preferred further development, in the event of a motor defect the electric voltage is switched off. For this, the switch element can be coupled with an element for the recognition of a motor defect.

If the motor is defective the rotating components of the motor and the lubricant pump, in particular the driveshaft, remain static. Accordingly, as an element for recognizing a defect of the lubricant pump, a rotational speed sensor is particularly suitable. This can for example measure the rotational speed of the driveshaft of the pump. If the sensor detects a reduced rotational speed or a stoppage, the switching element is actuated to switch off the voltage and thereby initiate emergency operation.

In a another further development, the device can instead comprise a second actuating element in addition to the first actuating element. The first actuating element is activated when the electric voltage is applied in particular to the first actuating element, which is designed to open the first clutch when activated.

The second actuating element is arranged between the first actuating element and the first clutch, so that it can act in combination with the first actuating element. Thus, while the electric voltage is applied in particular to the first actuating element so that the latter is activated, the second actuating element can close the first clutch and thereby initiate emergency operation.

Analogously to the switch element, the second actuating element closes the first clutch, preferably if the lubricant pump is defective. For this, the second actuating element can also be coupled with a means for recognizing a defect of the motor.

BRIEF DESCRIPTION OF THE DRAWING

An example embodiment of the invention, which is explained in more detail below, is illustrated in a sole FIGURE, which shows a lubricant pump with an electric motor and a connectable mechanical drive.

DETAILED DESCRIPTION OF THE PREFERRED EMBODIMENTS

The lubricant pump 101 shown in the FIGURE serves to supply lubricant to lubrication points of a transmission. The lubricant pump 101 is driven by a driveshaft 103. The driveshaft 103 passes through the housing of the lubricant pump 101 and is accessible from outside at both ends.

At a first end—on the right in the FIGURE—the driveshaft 103 is coupled in a rotationally, fixed manner to a driven, shaft 105 of an electric motor 107. The driveshaft 103 of the lubricant pump 101 and the shaft 105 of the electric motor 107 rotate about a common axis. In this way the electric motor 107 can drive the lubricant pump 101.

At a second end—on the left in the FIGURE—the driveshaft 103 is provided with a driving profile 109. The driving profile 109 is formed by external teeth that extend axially, i.e. parallel to the rotational axis of the driveshaft 103 and the shaft 105 of the electric motor 107. A pinion 111 has matching internal teeth. Thus, the internal teeth of the pinion 111 and the external teeth of the driving profile 109 engage with one another so that the pinion 111 is connected to the driveshaft 103 in a rotationally fixed manner. Moreover, the pinion 111 can be pushed onto the driveshaft 103 or onto its driving profile 109 in the axial direction.

Furthermore, the pinion 111 has external teeth 113. The external teeth 113 are formed so that they can mesh with a gearwheel 115. The gearwheel is in the force flow of a transmission, i.e. it is driven by the transmission.

A meshing connection between the external teeth 113 of the pinion 111 and the gearwheel 115 is formed when the pinion 111 is moved in a first direction—to the left in the FIGURE. On the other hand, if the pinion 111 is moved in a second direction—to the right in the FIGURE—the gearwheel 115 moves clear of the external teeth 113 so that the gearwheel 115 can rotate independently of the external teeth 113 and hence independently of the pinion 111, the drive profile 109 and the driveshaft 103 of the lubricant pump 101. Thus the pinion 111 constitutes a clutch, which can establish and/or interrupt a force flow between the gearwheel 115, in particular a shaft on which the gearwheel 115 is fixed, and the driveshaft 103 of the lubricant pump 101.

To move the pinion 111 from the first position to the second position and from the second position to the first position, a first actuating element 117 is provided. The first actuating element consists of a shifting fork 119, a solenoid magnet 121 and a spring 123.

The shifting fork 119 is mounted to pivot about a pivot axis arranged between the two ends of the shifting fork 119. One end of the shifting fork 119 engages in a groove 125 of the pinion 111. Another end of the shifting fork 119 is connected to a rod 127 of the solenoid magnet 121.

When the solenoid magnet 121 is activated, the rod 127 moves in the first direction. This movement causes the shifting fork 119 to move the pinion 111 in the second direction. As a result, the force flow between the gearwheel 115 and the driveshaft 103 of the lubricant pump 101 is interrupted.

Furthermore, the spring 123 is arranged so that it is stressed in the first direction by the movement of the rod 127. In other words, the solenoid magnet 121 acts in opposition to the spring force of the spring 123. So long as the solenoid magnet 121 is activated, the spring 123 remains stressed. If the solenoid magnet 121 is deactivated, the spring 123 can relax. This results in a movement of the rod 127 in the second direction. The shifting fork converts this movement into a movement of the pinion 111 in the first direction. The external teeth 113 and the gearwheel 115 consequently come into engagement. This establishes a load path between the gearwheel 115 and the driveshaft 103 of the lubricant pump 101. Thus, the lubricant pump 101 is driven by way of the gearwheel 115. A second actuating element 133 is arranged between the first actuating element 117 and the first clutch, so that it can act in combination with the first actuating element 117. Thus, while the electric voltage is applied in particular to the first actuating element 117 so that the latter is activated, the second actuating element 133 can close the first clutch 117.

By an appropriate choice of the gear ratio between the gearwheel 115 and the pinion 111, the quantity delivered by the lubricant pump 101 can be adapted to the anticipated needs.

To facilitate the meshing of the external teeth 113 of the pinion 111 in the gearwheel 115, the pinion 111 is provided with a sleeve 129 that can be moved in the axial direction. The sleeve 129 comprises the groove 125. A spring 131 fixes the sleeve 129 elastically relative to the pinion 111. If, during the meshing of the external teeth 113 of the pinion 111 with the gearwheel 115, the teeth of the gearwheel 115 and the external teeth 113 clash, the spring 131 exerts an axial pre-load on the pinion 111 in the first direction. This results in meshing of the external teeth 113 of the pinion 111 with the gearwheel 115 when the gearwheel 115 rotates a little farther, so that the teeth 115 and the external teeth 113 position themselves correctly relative to one another.

INDEXES

101 Lubricant pump
103 Driveshaft
105 Shaft
107 Electric motor
109 Drive profile
111 Pinion
113 External teeth
115 Gearwheel
117 Actuating element
119 Shifting fork
121 Solenoid magnet
123 Spring
125 Groove
127 Rod
129 Sleeve
131 Spring

The invention claimed is:

1. A device for supplying lubricant, the device comprising:
   a lubricant pump having a driveshaft that is electrically drivable and mechanically drivable,
   an electric motor being couplable to the driveshaft of the lubricant pump such that the lubricant pump is drivable by the electric motor,
   at least one clutch being engagable to establish a force flow between a force flow of a transmission and the driveshaft of the lubricant pump such that, when the clutch is engaged, the lubricant pump is mechanically driven by the force flow of the transmission,
   the clutch being disengageable to interrupt the force flow between the force flow of the transmission and the driveshaft of the lubricant pump such that, when the clutch is disengaged, the lubricant pump is electrically driven by the electric motor,
   a first actuating element comprising a shifting fork which is pivoted in a first direction by a solenoid magnet when the solenoid magnet is activated, and the shifting fork being pivoted in an opposite second direction by a spring when the solenoid magnet is deactivated,
   the shifting fork communicating with the clutch such that when the shifting fork is pivoted in the first direction, the clutch is disengaged to interrupt the force flow from the transmission to the driveshaft of the lubricant pump, and the lubrication pump is driven by the electric motor, and
   when the shifting fork is moved in the opposite second direction, the clutch is engaged to establish the force flow from the transmission to the driveshaft of the lubricant pump, and the lubrication pump is driven by the transmission.

2. The device according to claim 1, further comprising:
   the spring being in contact with the first actuating element that engages and disengages the clutch, the spring being stressed when the clutch is disengaged, and the clutch is disengaged when an electric voltage is applied to the first actuating element.

3. The device according to claim 2, further comprising a switch element for turning the electric voltage to the first actuating element on and off to activate and deactivate the solenoid magnet.

4. The device according to claim 3, wherein the electric voltage to the first actuating element is switched off to deactivate the solenoid magnet if the electric motor develops a defect.

5. The device according to claim 2, further comprising the first actuating element and a second actuating element, the solenoid magnet of the first actuating element is activated when the electric voltage is applied, and the first actuating element is designed to disengage the clutch when the solenoid magnet of the first actuating element is activated, and the second actuating element is arranged, between the first actuating element and the clutch, the second actuating element acts in combination with the first actuating element such that the second actuating element acts to engage the clutch when the clutch is disengaged by activation of the solenoid magnet of the first actuating element.

6. A device for supplying lubricant to a transmission, the device comprising:

a lubricant pump having a driveshaft comprising first and second axial ends;

an electric motor having a driven shaft, and the driven shaft being rotationally fixed to the first axial end of the driveshaft such that the lubricant pump is drivable by the electric motor;

a clutch being shiftable to first and second positions such that the clutch, when shifted into the first position, establishes a flow of force from the transmission to the driveshaft of the lubricant pump, and the clutch, when shifted into the second position, interrupts the flow of force from the transmission to the driveshaft of the lubricant pump; and an actuating element comprising a shifting fork, a solenoid magnet and a spring, the shifting fork communicating with the clutch and being movable in opposite directions, and the solenoid magnet communicating with the shifting fork and the spring such that:

when the solenoid magnet is activated, the shifting fork is moved in a first direction, against a force of the spring, such that the clutch is shifted into the second position to interrupt the flow of force from the transmission to the driveshaft of the lubricant pump, and the lubrication pump is driven by the electric motor, and when the solenoid magnet is deactivated, the shifting fork is moved in an opposite second direction, by the force of the spring, such that the clutch is shifted into the first position to establish the flow of force from the transmission to the driveshaft of the lubricant pump, and the lubrication pump is driven by the transmission.

7. The device according to claim 6, wherein the driveshaft of the lubricant pump and the driven shaft of the electric motor rotate about a common axis.

8. The device according to claim 6, wherein the clutch comprises a pinion having external teeth that mesh with teeth of a gearwheel that is located in the flow of force from the transmission.

9. The device according to claim 8, wherein the shifting fork is mounted to pivot about a pivot axis arranged between opposite first and second ends of the shifting fork, the first end of the shifting fork engages in a groove of the pinion and the second end of the shifting fork is connected to a rod of the solenoid magnet such that, when the solenoid magnet is activated, the rod pivots the shifting fork in the first direction such that the external teeth of the pinion disengage from the teeth of the gearwheel located in the flow of force from the transmission, and when the solenoid magnet is deactivated, the rod pivots the shifting fork in the second direction such that the external teeth of the pinion mesh with the teeth of the gearwheel located in the flow of force from the transmission.

10. The device according to claim 9, wherein the pinion comprises a sleeve that is slidable on the second end of the driveshaft of the lubricant pump, the sleeve comprises the groove which receives the first end of the shifting fork, a further spring is arranged on the sleeve axially between the pinion and the groove, and the further spring exerts an axial pre-load on the pinion in the first direction.

* * * * *